(12) United States Patent
Elshafie et al.

(10) Patent No.: US 12,022,313 B2
(45) Date of Patent: Jun. 25, 2024

(54) METHODS AND APPARATUS FOR INTERFERENCE REPORTING

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/482,194

(22) Filed: Sep. 22, 2021

(65) Prior Publication Data

US 2022/0095147 A1 Mar. 24, 2022

Related U.S. Application Data

(60) Provisional application No. 63/082,913, filed on Sep. 24, 2020.

(51) Int. Cl.
*H04W 24/10* (2009.01)
*H04L 5/00* (2006.01)
*H04W 24/08* (2009.01)
*H04W 72/20* (2023.01)

(52) U.S. Cl.
CPC ........... *H04W 24/10* (2013.01); *H04L 5/0048* (2013.01); *H04W 24/08* (2013.01); *H04W 72/20* (2023.01)

(58) Field of Classification Search
CPC .......................... H04W 72/0406; H04W 24/08
See application file for complete search history.

(56) References Cited

U.S. PATENT DOCUMENTS

| | | | | |
|---|---|---|---|---|
| 2013/0088986 A1* | 4/2013 | Xiao | ..................... | H04B 7/0456 370/252 |
| 2014/0133333 A1* | 5/2014 | Liu | ....................... | H04W 24/10 370/336 |
| 2017/0359632 A1* | 12/2017 | Qu | ......................... | H04B 17/24 |
| 2018/0063736 A1* | 3/2018 | Sadeghi | ............... | H04W 24/10 |
| 2023/0007523 A1* | 1/2023 | Fu | ..................... | H04B 7/18541 |

* cited by examiner

*Primary Examiner* — Zhiren Qin
(74) *Attorney, Agent, or Firm* — Arent Fox Schiff LLP

(57) ABSTRACT

Aspects of the present disclosure include methods, apparatuses, and computer readable media for receiving control information indicating a starting time and at least one of a duration or an end time associated with the interference measurements, wherein the duration is a difference between the end time and the starting time, measuring a plurality of reference signals associated with the interference measurements between the starting time and the end time at a period, generating a plurality of interference reports based on measuring the plurality of reference signals, and transmitting the plurality of interference reports to a base station (BS).

22 Claims, 12 Drawing Sheets

METHODS AND APPARATUS FOR INTERFERENCE REPORTING

CROSS REFERENCE TO RELATED APPLICATIONS

The current application relates to U.S. Provisional Application No. 63/082,913 filed on Sep. 24, 2020, entitled "METHODS AND APPARATUS FOR INTERFERENCE REPORTING," the contents of which are hereby incorporated by reference in their entireties.

BACKGROUND

Aspects of the present disclosure relate generally to wireless communications, and more particularly, to apparatuses and methods for interference reporting.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a base station (BS) may transmit reference signals in one or more communication channels to a user equipment (UE). The UE may measure the reference signals, and transmit a report associated with the measurements to the BS. The report may provide channel feedback (e.g., interference feedback) to the BS. The BS may rely on the report to adjust parameters related to the one or more communication channel. However, it is unclear how the UE should measure the reference signals associated with channel interference. Therefore, improvements in signaling interference measurements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving control information indicating a starting time and at least one of a duration or an end time associated with the interference measurements, wherein the duration is a difference between the end time and the starting time, measuring a plurality of reference signals associated with the interference measurements between the starting time and the end time at a period, generating a plurality of interference reports based on measuring the plurality of reference signals, and transmitting the plurality of interference reports to a base station (BS).

Other aspects of the present disclosure include a user equipment (UE) having a memory comprising instructions, a transceiver, and one or more processors operatively coupled with the memory and the transceiver, the one or more processors configured to execute instructions in the memory to receive control information indicating a starting time and at least one of a duration or an end time associated with the interference measurements, wherein the duration is a difference between the end time and the starting time, measure a plurality of reference signals associated with the interference measurements between the starting time and the end time at a period, generate a plurality of interference reports based on measuring the plurality of reference signals, and transmit the plurality of interference reports to a base station (BS).

An aspect of the present disclosure includes a user equipment (UE) including means for receiving control information indicating a starting time and at least one of a duration or an end time associated with the interference measurements, wherein the duration is a difference between the end time and the starting time, means for measuring a plurality of reference signals associated with the interference measurements between the starting time and the end time at a period, means for generating a plurality of interference reports based on measuring the plurality of reference signals, and means for transmitting the plurality of interference reports to a base station (BS).

Some aspects of the present disclosure include non-transitory computer readable media having instructions stored therein that, when executed by one or more processors of a user equipment (UE), cause the one or more processors to receive control information indicating a starting time and at least one of a duration or an end time associated with the interference measurements, wherein the duration is a difference between the end time and the starting time, measure a plurality of reference signals associated with the interference measurements between the starting time and the end time at a period, generate a plurality of interference reports based on measuring the plurality of reference signals, and transmit the plurality of interference reports to a base station (BS).

Aspects of the present disclosure include methods by a user equipment (UE) for receiving control information indicating a report number of a plurality of interference reports associated with the interference measurement session, determining a plurality of times for measuring a plurality of reference signals associated with the interference measurement session, measuring the plurality of reference signals at each of the plurality of determined times, generating the plurality of interference reports based on measuring the plurality of reference signals, and transmitting the plurality of interference reports to a base station (BS).

Other aspects of the present disclosure include a user equipment (UE) having a memory comprising instructions, a transceiver, and one or more processors operatively coupled with the memory and the transceiver, the one or more processors configured to execute instructions in the memory to receive control information indicating a report number of a plurality of interference reports associated with the interference measurement session, determine a plurality of times for measuring a plurality of reference signals associated with the interference measurement session, measure the plurality of reference signals at each of the plurality of determined times, generate the plurality of interference reports based on measuring the plurality of reference signals, and transmit the plurality of interference reports to a base station (BS).

An aspect of the present disclosure includes a user equipment (UE) including means for receiving control information indicating a report number of a plurality of interference reports associated with the interference measurement session, means for determining a plurality of times for measuring a plurality of reference signals associated with the interference measurement session, means for measuring the plurality of reference signals at each of the plurality of determined times, means for generating the plurality of interference reports based on measuring the plurality of reference signals, and means for transmitting the plurality of interference reports to a base station (BS).

Some aspects of the present disclosure include non-transitory computer readable media having instructions stored therein that, when executed by one or more processors of a user equipment (UE), cause the one or more processors to receive control information indicating a report number of a plurality of interference reports associated with the interference measurement session, determine a plurality of times for measuring a plurality of reference signals associated with the interference measurement session, measure the plurality of reference signals at each of the plurality of determined times, generate the plurality of interference reports based on measuring the plurality of reference signals, and transmit the plurality of interference reports to a base station (BS).

Aspects of the present disclosure include methods by a user equipment (UE) for receiving control information indicating a report number (M) and two or more periods, measuring a plurality of reference signals associated with M interference measurements, wherein each adjacent pair of the M interference measurements are separated by corresponding one of the two or more periods, generating M interference reports based on measuring the plurality of reference signals, and transmitting the M interference reports to a base station (BS).

Other aspects of the present disclosure include a user equipment (UE) having a memory comprising instructions, a transceiver, and one or more processors operatively coupled with the memory and the transceiver, the one or more processors configured to execute instructions in the memory to receive control information indicating a report number (M) and two or more periods, measure a plurality of reference signals associated with M interference measurements, wherein each adjacent pair of the M interference measurements are separated by corresponding one of the two or more periods, generate M interference reports based on measuring the plurality of reference signals, and transmit the M interference reports to a base station (BS).

An aspect of the present disclosure includes a user equipment (UE) including means for receiving control information indicating a report number (M) and two or more periods, means for measuring a plurality of reference signals associated with M interference measurements, wherein each adjacent pair of the M interference measurements are separated by corresponding one of the two or more periods, means for generating M interference reports based on measuring the plurality of reference signals, and means for transmitting the M interference reports to a base station (BS).

Some aspects of the present disclosure include non-transitory computer readable media having instructions stored therein that, when executed by one or more processors of a user equipment (UE), cause the one or more processors to receive control information indicating a report number (M) and two or more periods, measure a plurality of reference signals associated with M interference measurements, wherein each adjacent pair of the M interference measurements are separated by corresponding one of the two or more periods, generate M interference reports based on measuring the plurality of reference signals, and transmit the M interference reports to a base station (BS).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
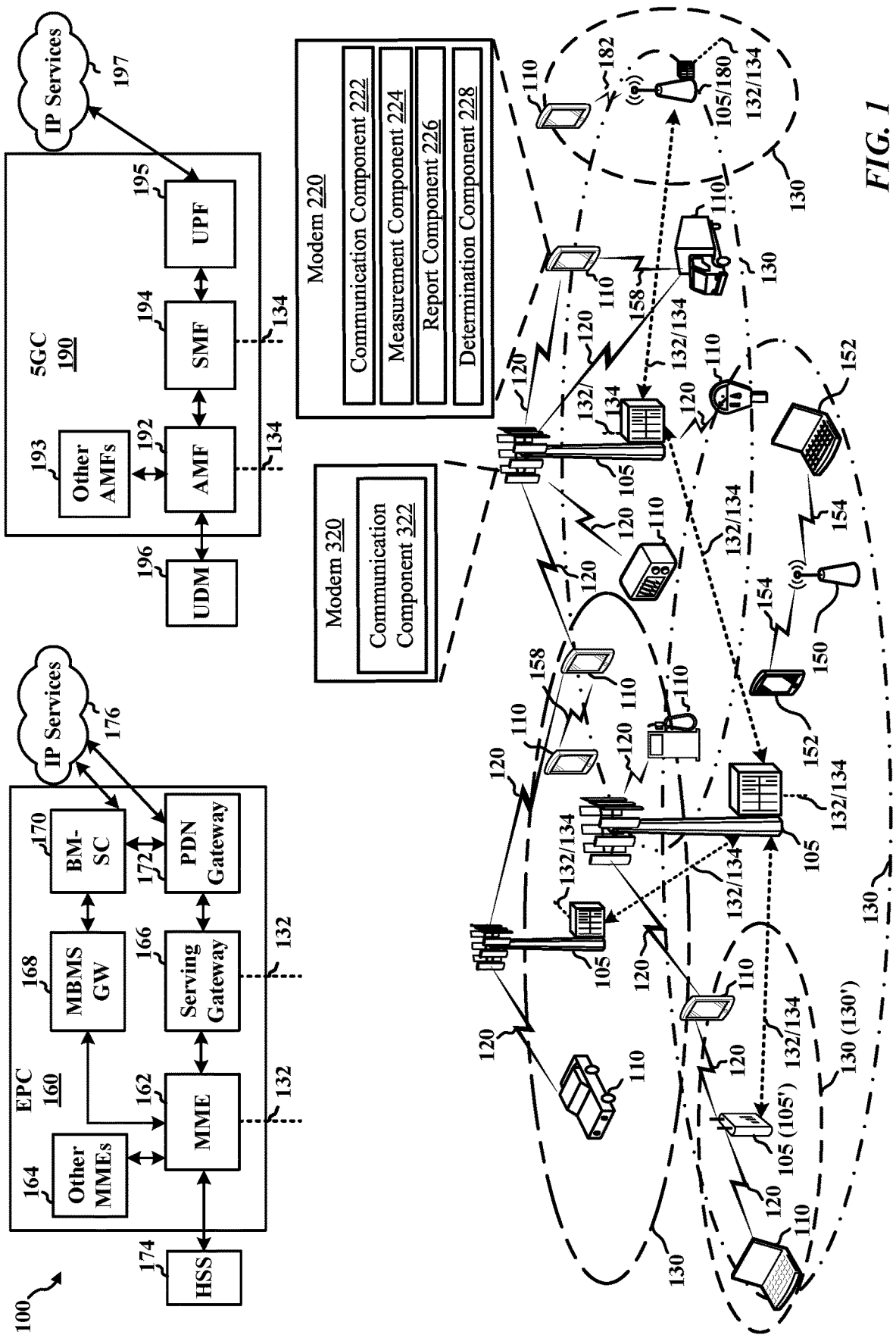
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, a base station (BS) may transmit control information associated with interference measurements to a user equipment (UE). The control information may indicate at least one of a starting time, a duration, an end time, a frequency of measurements, a reporting time, or other parameters associated with the interference measurements. In response to receiving the control information, the UE may measure interference reference signals and transmit one or more reports to the BS based on the parameters received in the control information.

In some aspects of the present disclosure, the signaling of one or more of the parameters indicated above may be triggered. For instance, instead of signaling the parameters, the base station may determine the initial values of the parameters (or changing them semi-statically) in radio resource control (RRC), medium access control (MAC) control element (MAC-CE), and/or downlink control information (DCI). The measurements and/or re-measurements may be triggered. For example, the base station may utilize the DCI to activate and/or reactivate the interference measurements.

In some aspects, the parameters may be modified using a DCI for current or future measurements. The parameters may be semi-static or fixed for a period of time based on the interference behavior (e.g., coherence time, dynamics, and/or characteristics). The base station may configure and/or reconfigure the parameters using RRC and/or MAC-CE. In other aspects, the base station may use DCI to change one or more of the parameters.

In certain aspects of the present disclosure, the UE may, based on the format of the DCI, determine whether there is a parameter change or not. For example, some formats may be used by the base station to indicate a change in the parameters in the DCI. Some formats may indicate to the UE to use the parameters as is. Alternatively or additionally, the base station may include a parameter change flag in the DCI and add the parameter change based on the mode.

In some aspects, the one or more reports may be transmitted via a physical uplink control channel (PUCCH) or a physical uplink shared channel (PUSCH). The measurement process may be triggered by the MAC-CE and/or the DCI.

In some implementations, the feedback of the interference report may be transmitted in a single stage or multiple stages of PUCCH and/or PUSCH.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. The UE 110 may include a measurement component 224 configured to measure the reference signals associated with interference measurements. The UE 110 may include a report component 226 configured to generate a report associated with the interference measurements. The UE 110 may include a determination component 228 configured to determine measurement parameters. In some implementations, the communication component 222, the measurement component 224, the report component 226, and/or the determination component 228 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
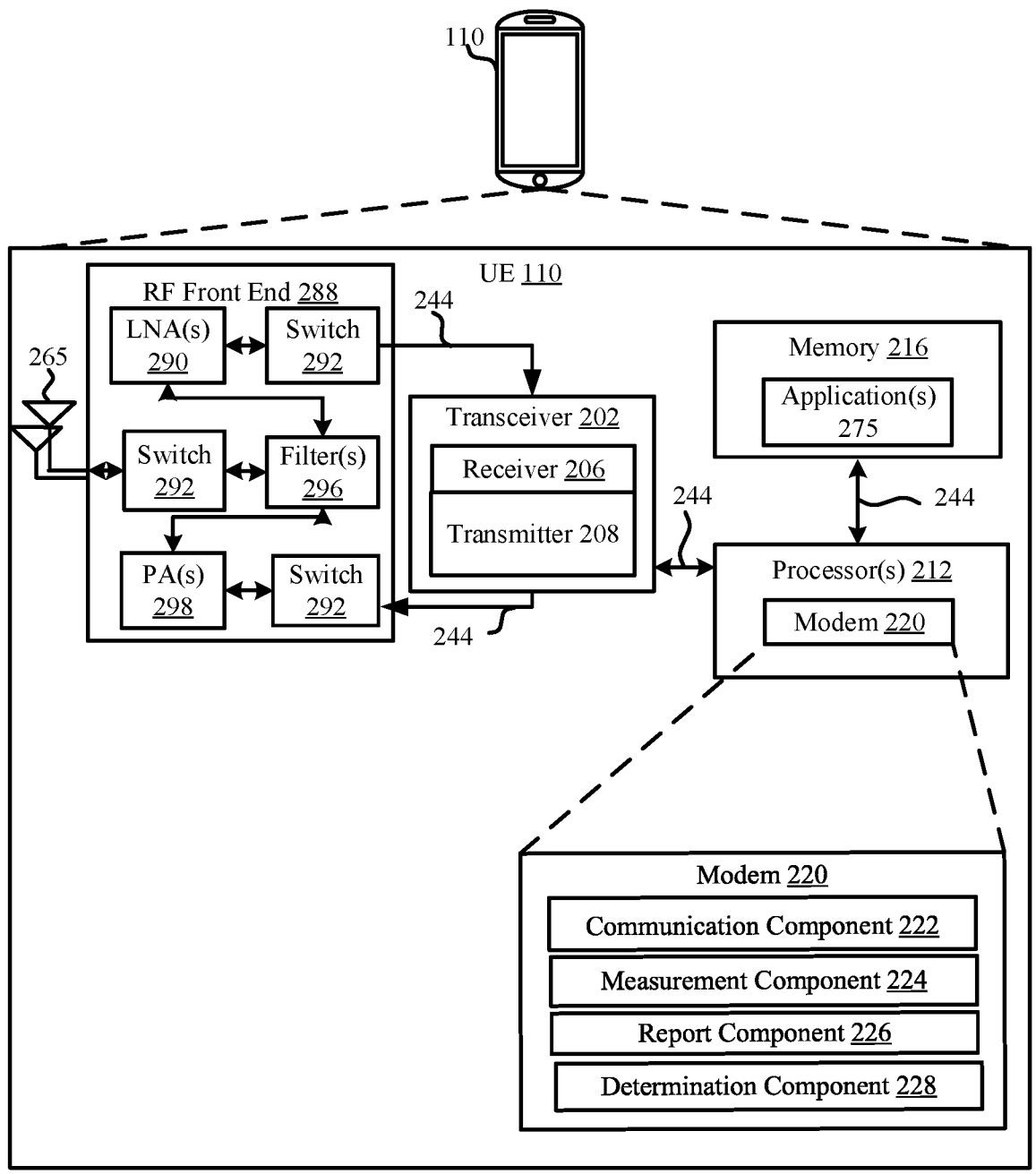
FIG. 2 is a schematic diagram of an example of a user equipment.

Referring to FIG. 2, one example of an implementation of the UE 110 may include a modem 220 having the communication component 222, the measurement component 224, the report component 226, and/or the determination component 228. In one implementation, the UE 110 may include a communication component 222 configured to communicate with the BS 105 via a cellular network, a Wi-Fi network, or other wireless and wired networks. The UE 110 may include a measurement component 224 configured to measure the reference signals associated with interference measurements. The UE 110 may include a report component 226 configured to generate a report associated with the interference measurements. The UE 110 may include a determination component 228 configured to determine measurement parameters.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the measurement component 224, the report component 226, and/or the determination component 228 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the measurement component 224, the report component 226, and/or the determination component 228, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the measurement component 224, the report component 226, and/or the determination component 228, and/or one or more of the subcomponents, and/or data associated therewith, when UE 110 is operating at least one processor 212 to execute the communication component 222, the measurement component 224, the report component 226, and/or the determination component 228, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
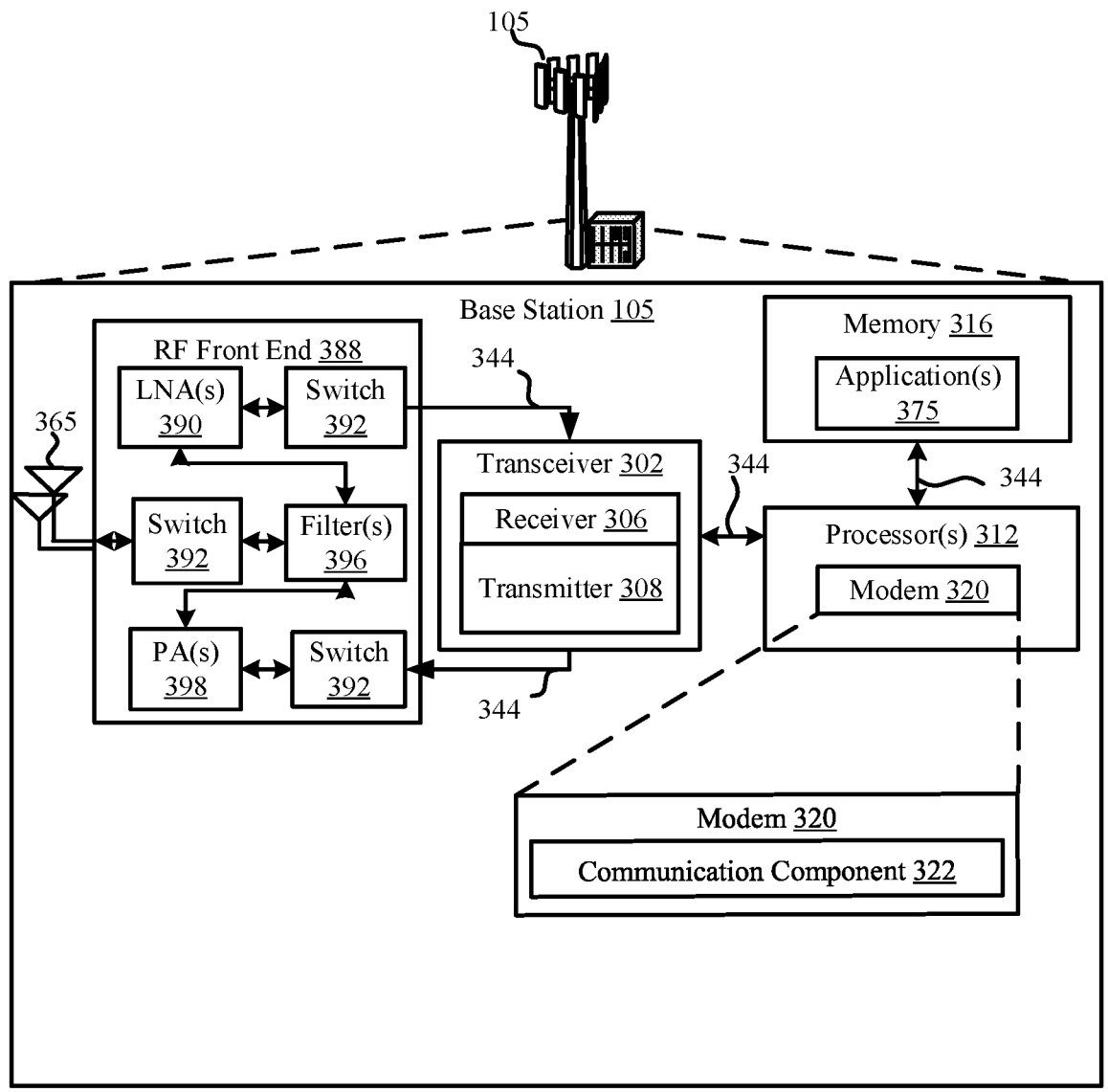
FIG. 3 is a schematic diagram of an example of a base station.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
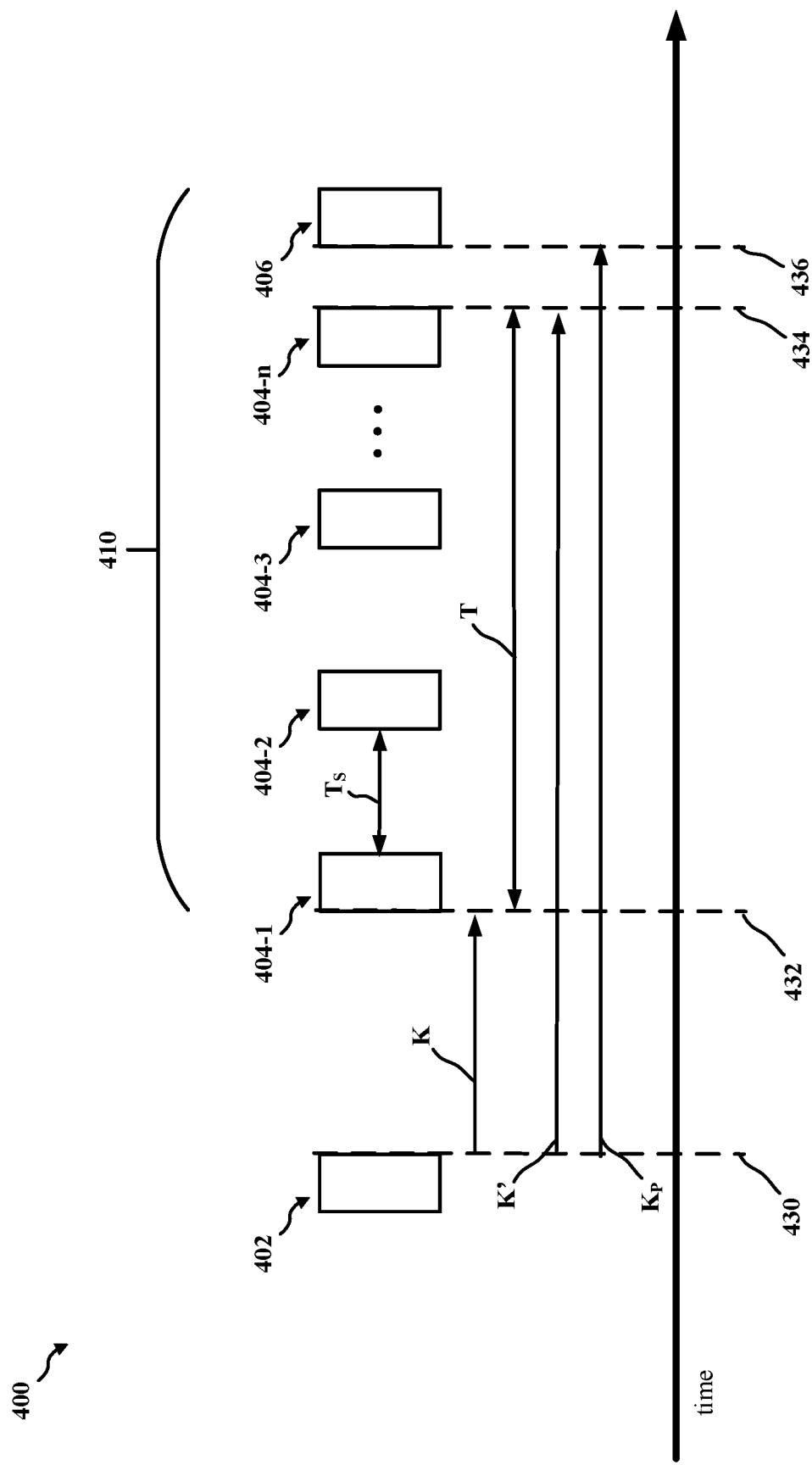
FIG. 4 is an example of a timing diagram for measuring interference reference signals according to aspects of the present disclosure.

FIG. 4 is an example of a timing diagram for measuring interference reference signals. In an aspect, a timing diagram 400 may illustrate timings for resources allocated for the measurement of interference reference signals and the reporting. The BS 105 may transmit at least one of a starting time, a duration, an end time, a frequency of measurement, a reporting time, or other parameters associated with the interference measurements. In response, the UE 110 may measure references signals and/or transmit report associated with the interference measurements based on the parameters indicated by the BS 105. In some implementations, the BS 105 may transmit control information 402 to the UE 110. The UE 110 may receive the control information 402. The UE 110 may identify a trigger time 430 based on an indication in the control information 402, or reception of the control information 402. The trigger time 430 may be the basis that the UE 110 relies on to determine timing of measuring interference on the reference signals to generate interference measurements.

In an aspect of the present disclosure, the UE 110 may receive the control information 402, which includes information associated with an interference measurement session 410. For example, the control information 402 may include a K value to indicate a starting time 432 of the interference measurement session 410. Specifically, K may be the time (e.g., slots, orthogonal frequency division multiplexing (OFDM) symbols, or seconds) measured from the trigger time 430. The starting time 432 may indicate a first measurement 404-1 of the measurements 404-1, 404-2 . . . 404-*n*, where n is a positive integer.

In some aspects of the present disclosure, the control information 402 may include a T value to indicate the duration of the measurements 404-1, 404-2 . . . 404-*n*. The UE 110 may determine an end time 434 based on the starting time 432 and the T value. Alternatively, the control information 402 may include a K' value to indicate the end time 434. K' may be the time (e.g., slots, OFDM symbols, or seconds) measured from the trigger time 430. The UE 110 may determine the T value based on the difference between the end time 434 and the starting time 432.

In an aspect of the present disclosure, the control information 402 may include a $T_s$ value to indicate a period between the measurements 404-1, 404-2 . . . 404-*n*. The UE 110 may determine a number of measurements 404-1, 404-2 . . . 404-*n* (i.e., the number n) based on the starting time 432, the end time 434, and the $T_s$ value. For example, the UE 110 may determine the number of measurements 404-1, 404-2 . . . 404-*n* based on the equation $$n = \left\lfloor \frac{T}{T_S} \right\rfloor.$$

In one aspect, the control information 402 may include a $K_P$ value to indicate a reporting time 436 to transmit interference reports 406 based on the results of the measurement 404-1, 404-2 . . . 404-*n*.

In certain aspects, the UE 110 may perform the measurements 404-1, 404-2 . . . 404-*n* based on the control information 402 transmitted by the BS 105. The UE 110 may generate the interference reports 406 based on the measurements 404-1, 404-2 . . . 404-*n*. The interference reports 406 may include a number of sub-reports each associated with one of the measurements 404-1, 404-2 . . . 404-n. For example, the interference reports 406 may include n sub-reports associated with each measurement of the measurements 404-1, 404-2 . . . 404-n. A report number associated with the number of sub-reports (M) may be determined using the equation $$M = \left\lfloor \frac{T}{T_S} \right\rfloor.$$

The UE 110 may transmit the interference reports 406 to the BS 105 indicating the results of the measurements 404-1, 404-2 . . . 404-n. The interference reports 406 may include one or more of interference average power, interference covariance matrix rank, ratio between minimum and maximum eigenvalues, maximum eigenvalue, or interference covariance matrix eigenvalues. The UE 110 may transmit the interference reports 406 using resources allocated by the BS 105. In some aspects, the UE 110 may transmit the interference reports 406 via a physical uplink control channel (PUCCH) or physical uplink shared channel (PUSCH).

In certain aspects, the resources allocated by the BS 105 for the interference reports 406 may be indicated in the control information 402.

In some aspects, the UE 110 may receive interference information for configuring at least one of quantization levels of interference power or the interference covariance matrix eigenvalues in response to transmitting the interference reports 406.

In a first example, the BS 105 may transmit the control information 402 including the K value of 4 slots, the T value of 10 slots, the $T_s$ value of 2 slots, and the $K_P$ value of 15 slots. The UE 110 may determine the trigger time 430 based on a time associated with the end of reception of the control information 402. Based on the control information 402, the UE 110 may determine the starting time 432 to be 4 slots after the trigger time 430, the end time 434 to be 14 slots after the trigger time 430, and the reporting time 436 to be 15 slots after the trigger time 430. Based on the starting time 432, the end time 434, and the $T_s$ value, the UE 110 may determine to perform four measurements (i.e., n=4). At 4 slots after the trigger time 430, the UE 110 may measure a first reference signal or a first group of reference signals transmitted by the BS 105 for the first measurement 404-1. At 7 slots after the trigger time 430, the UE 110 may measure a second reference signal or a second group of reference signals for the second measurement 404-2. At 10 slots after the trigger time 430, the UE 110 may measure a third reference signal or a third group of reference signals for the third measurement 404-3. At 13 slots after the trigger time 430, the UE 110 may measure a fourth reference signal or a fourth group of reference signals for the fourth measurement 404-4. The reference signal(s) may include channel state information (CSI) interference measurement (IM) reference signals (CSI-IM-RSs) or zero-power (ZP) CSI-RSs (ZP CSI-RSs). At 15 slots after the trigger time 430, the UE 110 may transmit the interference reports 406 to the BS 105 based on the measurements 404-1, 404-2, 404-3, 404-4. Although each measurement of the measurements 404-1, 404-2, 404-3, 404-4 is 1 slot in length in the current example, other durations for the measurements 404-1, 404-2, 404-3, 404-4 may also be implemented.

In a second example, the BS 105 may transmit the control information 402 including the K value of 2 symbols, the K' value of 10 symbols, the $T_s$ value of 1 symbol, and the $K_P$ value of 12 symbols. The UE 110 may determine the trigger time 430 based on a time associated with the end of reception of the control information 402. Based on the control information 402, the UE 110 may determine the starting time 432 to be 2 symbols after the trigger time 430, the end time 434 to be 10 symbols after the trigger time 430, and the reporting time 436 to be 12 symbols after the trigger time 430. Based on the starting time 432, the end time 434, and the $T_s$ value, the UE 110 may determine to perform three measurements (i.e., n=3). At 2 symbols after the trigger time 430, the UE 110 may measure a first reference signal or a first group of reference signals transmitted by the BS 105 for the first measurement 404-1. At 5 symbols after the trigger time 430, the UE 110 may measure a second reference signal or a second group of reference signals for the second measurement 404-2. At 8 symbols after the trigger time 430, the UE 110 may measure a third reference signal or a third group of reference signals for the third measurement 404-3. At 12 symbols after the trigger time 430, the UE 110 may transmit the interference reports 406 to the BS 105 based on the measurements 404-1, 404-2, 404-3. Here, each measurement of the measurements 404-1, 404-2, 404-3 is 2 symbols in duration.

In some implementations, the control information 402 may indicate the time duration for each measurement. In other instances, the UE 110 may be configured with the time duration for each measurement.

In one optional implementation, the BS 105 may transmit the control information 402 which may be at least one of downlink control information (DCI), radio resource control (RRC) information, or a medium access control (MAC) control element (MAC-CE) including the control information. In one instance, the BS 105 may signal the control information 402 dynamically using the DCI and/or semi-statically using the RRC information or the MAC-CE.

In an optional implementation, the BS 105 may configure a number of parameter sets associated with interference measurements. The BS 105 may indicate the parameter sets to the UE 110. For example, the BS 105 may configure a first set of parameters [$K_1$ $K_1'$ $T_{S1}$ $K_{P1}$], a second set of parameters [$K_2$ $K_2'$ $T_{S2}$ $K_2$] . . . an $I^{th}$ set of parameters [$K_I$ $K_I'$ $T_{SI}$ $K_{PI}$]. The BS 105 may transmit an indicator associated with one of the sets of parameter to the UE 110. The UE 110 may receive the indicator and perform the interference measurements based on the parameters in the indicated set.

Figure 5:
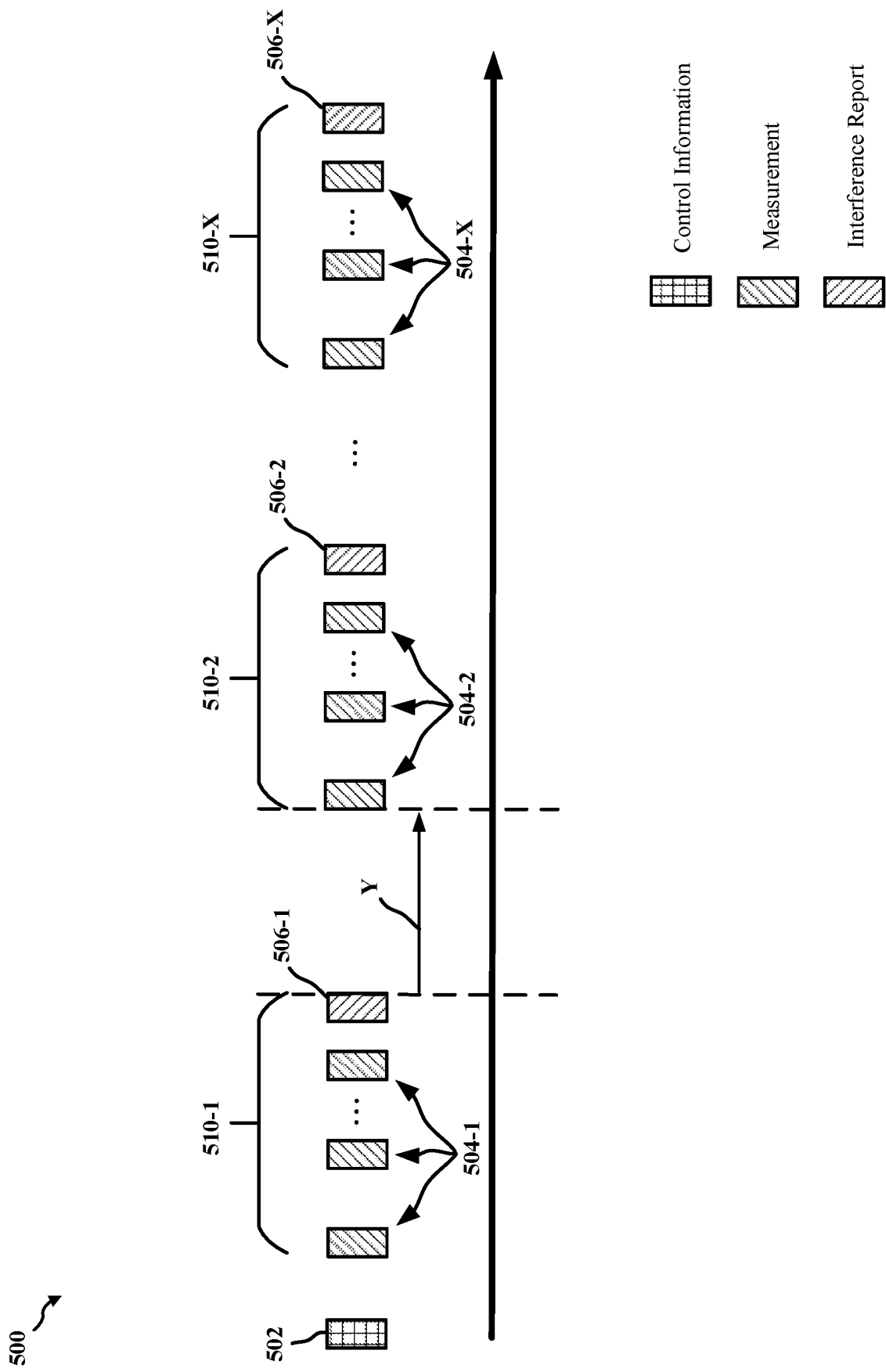
FIG. 5 is an example of a timing diagram for measuring interference reference signals in multiple sessions according to aspects of the present disclosure.

FIG. 5 is an example of a timing diagram for measuring interference reference signals in multiple sessions. In an aspect, a timing diagram 500 may illustrate timings for resources allocated for the measurement of interference reference signals and the reporting in multiple sessions. The BS 105 may transmit control information 502 to the UE 110. The control information 502 may include information associated with one or more interference measurement sessions 510, such as a X value indicating a repetition number of the number of interference measurement sessions 510 and/or a Y value indicating a gap duration between two adjacent interference measurement sessions 510.

In some aspects, the control information 502 may optionally include parameters associated with measuring interference reference signals during measurements 504-1, 504-2 . . . 504-X as discussed above with respect to FIG. 4. The control information 502 may optionally include parameters associated with transmitting interference reports 506-1, 506-2 . . . 506-X as discussed above with respect to FIG. 4.

In certain aspects, the UE 110 may receive the control information 502 from the BS 105. The UE 110 may determine the number of interference measurement sessions 510 based on the X value and the gap duration between two adjacent interference measurement session based on the Y value. The UE 110 may implement the first interference measurement session 510-1 by measuring interference reference signals during the first measurements 504-1. The UE 110 may transmit the first interference reports 506-1. Subsequently, the UE 110 may repeat the first interference measurement session 510-1 (based on the X value) by implementing the second interference measurement session 510-2. For the second interference measurement session 510-2, the UE 110 may measure interference reference signals during the second measurements 504-2 and/or transmit the second interference reports 506-2. The gap duration between the first interference measurement session 510-1 and the second interference measurement session 510-2 may be determine by the Y value, which may be represented in slots, symbols, and/or seconds. For example, the second interference measurement session 510-2 may be allocated Y slots, symbols, or seconds after the first interference measurement session 510-1. In some aspects of the present disclosure, the UE 110 may implement X interference measurement session.

In an example, the BS 105 may transmit the control information 502 to the UE 110. The control information 502 may include the X value of 3 and the Y value of 4 slots. The control information 502 may include an indicator indicating a set of parameters. In response to receiving the indicator, the UE 110 may identify the set of parameters associated with the indicator, such as [K=2 K'=7 $T_S$=1 $K_P$=8]. The association between the indicator and the set of parameters (e.g., look-up table) may be stored in the memory 216 of the UE 110 (FIG. 2). The set of parameters may be stored in the memory 216 of the UE 110 (FIG. 2). Alternatively, the UE 110 may obtain the association and/or the set of parameters from the BS 105.

In some implementations, the UE 110 may implement the first interference measurement session 510-1 based on the set of parameters. The UE 110 may begin measuring the first measurements 504-1 at 2 slots after the control information 502. Each measurement of the first measurements 504-1 may be separated by 1 slot. The UE 110 may perform three measurements (each 1 slot in duration) separated by 1 slot. The UE 110 may transmit the first interference reports 506-1 at 8 slots after the control information 502.

In certain implementations, the UE 110 may implement the second interference measurement session 510-2 at 4 slots after the first interference measurement session 510-1. The UE 110 may implement the second interference measurement session 510-1 based on the set of parameters used in the first interference measurement session 510-1. Alternatively, the UE 110 may implement the second interference measurement session 510-1 based on a different set of parameters.

In some implementations, the UE 110 may begin measuring the second measurements 504-2 at 4 slots after the first interference reports 506-1. Similar to the first measurements 504-1, each measurement of the second measurements 504-2 may be separated by 1 slot. The UE 110 may perform three measurements (each 1 slot in duration) separated by 1 slot. The UE 110 may transmit the second interference reports 506-2 at 10 slots after the first interference reports 506-1.

In certain implementations, the UE 110 may begin measuring the third measurements 504-3 at 4 slots after the second interference reports 506-2. Similar to the first measurements 504-1 and the second measurements 504-2, each measurement of the third measurements 504-3 may be separated by 1 slot. The UE 110 may perform three measurements (each 1 slot in duration) separated by 1 slot. The UE 110 may transmit the third interference reports 506-3 at 10 slots after the second interference reports 506-2.

In some aspects, the BS 105 may not allocate dedicated CSI-IM resources. The UE 110 may determine the times to measure the reference signals and/or report the results of the measurements. In some aspects, the UE 110 may report the average time between reports via PUCCH or PUSCH. The average time may be an average value of the gap durations (if varying) between the interference reports 506.

In one optional implementation, the BS 105 may transmit the control information 502 which may be at least one of downlink control information (DCI), radio resource control (RRC) information, or a medium access control (MAC) control element (MAC-CE). In one instance, the BS 105 may signal the control information 502 dynamically using the DCI and/or semi-statically using the RRC information or the MAC-CE.

Figure 6:
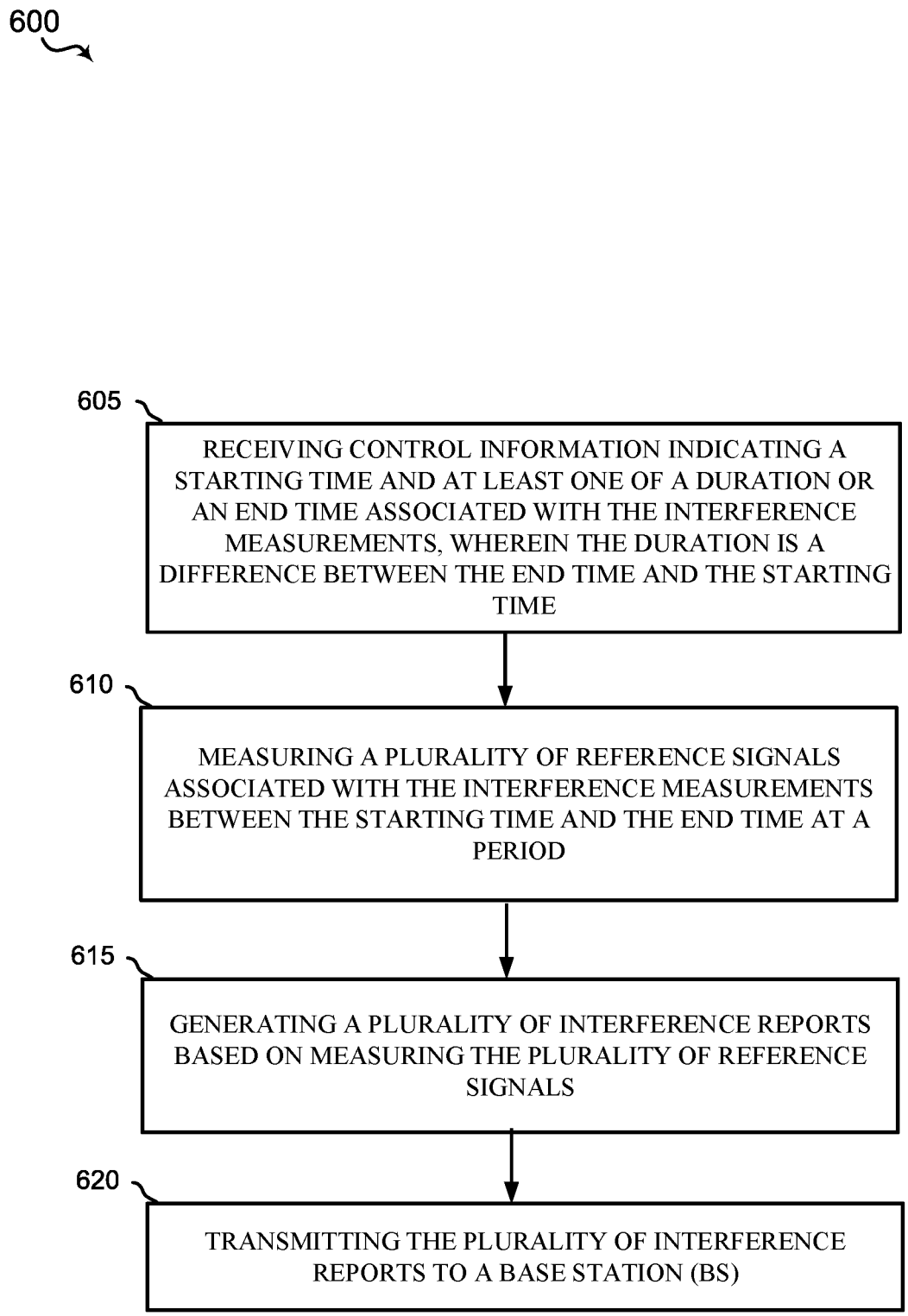
FIG. 6 is an example of a method for transmitting measurement reports according to aspects of the present disclosure.

FIG. 6 is an example of a method for transmitting measurement reports. For example, a method 600 may be performed by the one or more of the processor 212, the memory 216, the applications 275, the modem 220, the transceiver 202, the receiver 206, the transmitter 208, the RF front end 288, the communication component 222, the measurement component 224, the report component 226, and/or the determination component 228, and/or one or more other components of the UE 110 in the wireless communication network 100.

At block 605, the method 600 may receive control information indicating a starting time and at least one of a duration or an end time associated with the interference measurements, wherein the duration is a difference between the end time and the starting time. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive control information indicating a starting time and at least one of a duration or an end time associated with the interference measurements, wherein the duration is a difference between the end time and the starting time as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving control information indicating a starting time and at least one of a duration or an end time associated with the interference measurements, wherein the duration is a difference between the end time and the starting time.

At block 610, the method 600 may measure a plurality of reference signals associated with the interference measurements between the starting time and the end time at a period. For example, the measurement component 224, the processor 212, the memory 216, the modem 220, and/or the applications 275 of the UE 110 may measure a plurality of reference signals associated with the interference measurements between the starting time and the end time at a period as described above.

In certain implementations, the measurement component 224, the processor 212, the memory 216, the modem 220, and/or the applications 275 may be configured to and/or may define means for measuring a plurality of reference signals associated with the interference measurements between the starting time and the end time at a period.

At block 615, the method 600 may generate a plurality of interference reports based on measuring the plurality of reference signals. For example, the report component 226, the processor 212, the memory 216, the modem 220, and/or the applications 275 of the UE 110 may generate a plurality of interference reports based on measuring the plurality of reference signals as described above. In some instances, the plurality of interference reports may include interference measurements.

In certain implementations, the report component 226, the processor 212, the memory 216, the modem 220, and/or the applications 275 may be configured to and/or may define means for generating a plurality of interference reports based on measuring the plurality of reference signals.

At block 620, the method 600 may transmit the plurality of interference reports to a base station (BS). For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the plurality of interference reports to a base station (BS) as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the plurality of interference reports to a base station (BS).

Alternatively or additionally, the method 600 may further include any of the methods above, wherein the plurality of reference signals are a plurality of channel state information interference measurement reference signals or zero-power channel state information reference signals resource.

Alternatively or additionally, the method 600 may further include any of the methods above, wherein receiving the control information comprises receiving at least one of downlink control information (DCI), radio resource control (RRC) information, or a medium access control (MAC) control element (MAC-CE) comprising the control information.

Alternatively or additionally, the method 600 may further include any of the methods above, wherein receiving the control information comprises receiving at least one of the period, a number of the plurality of interference reports, or a frequency location of resources allocated for transmitting the plurality of interference reports.

Alternatively or additionally, the method 600 may further include any of the methods above, wherein at least one of the plurality of interference reports comprises one or more of interference average power, interference covariance matrix rank, ratio between minimum and maximum eigenvalues, maximum eigenvalue, or interference covariance matrix eigenvalues.

Alternatively or additionally, the method 600 may further include any of the methods above, further comprising receiving, in response to transmitting the plurality of interference reports, interference information for configuring at least one of quantization levels of interference power or the interference covariance matrix eigenvalues.

Figure 7:
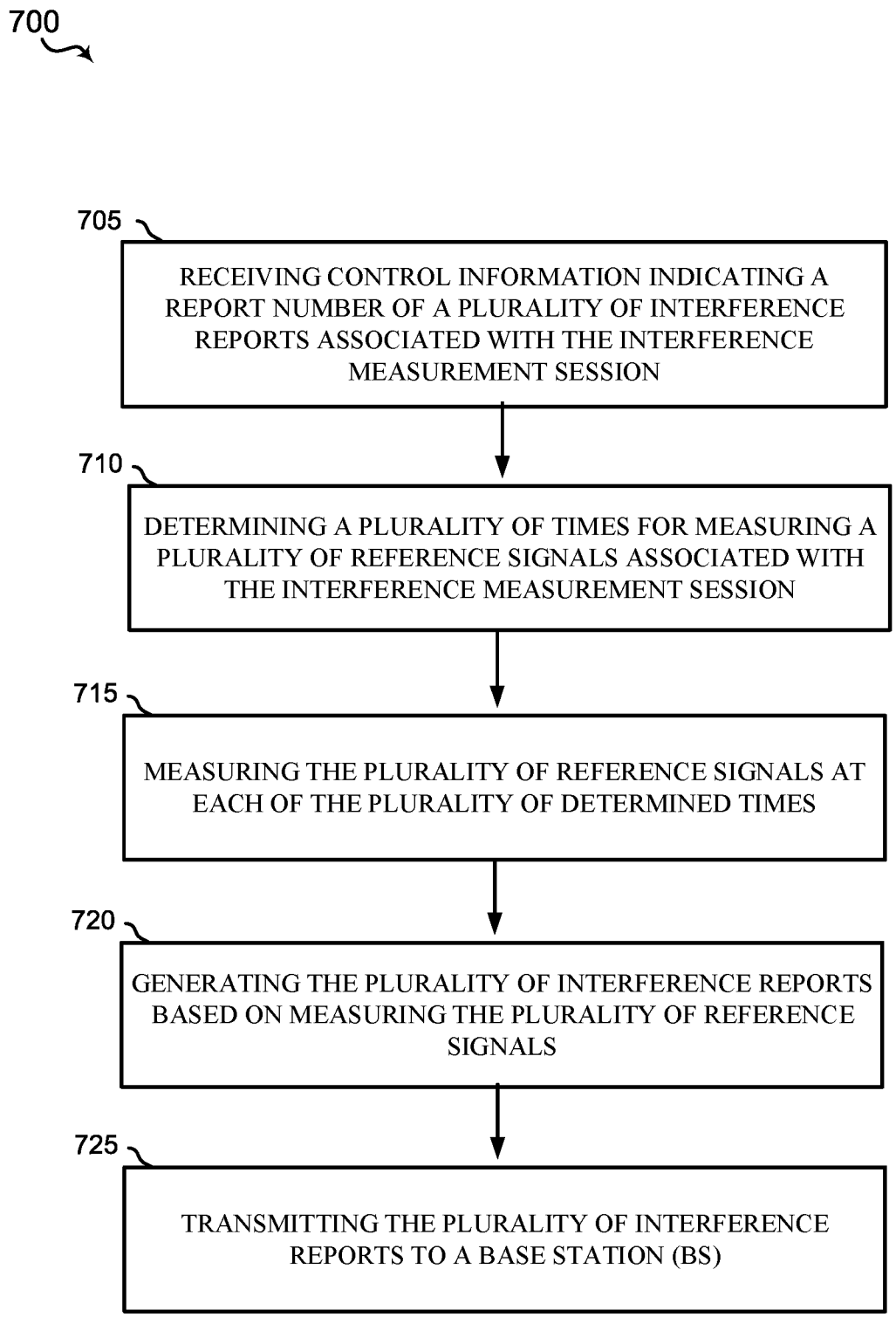
FIG. 7 is an example of a method for transmitting measurement reports in multiple sessions according to aspects of the present disclosure.

Alternatively or additionally, the method 600 may further include any of the methods above, wherein receiving the control information comprises receiving a configuration indicator of a plurality of configuration indicators, wherein the configuration indicator is associated with the starting time and at least one of the duration or the end time The configuration indicator may be associated with at least one of a starting time, a duration, an end time, a frequency of measurements, a reporting time, or other parameters associated with the interference measurements FIG. 7 is an example of a method for transmitting measurement reports in multiple sessions. For example, a method 700 may be performed by the one or more of the processor 212, the memory 216, the applications 275, the modem 220, the transceiver 202, the receiver 206, the transmitter 208, the RF front end 288, the communication component 222, the measurement component 224, the report component 226, and the determination component 228, and/or one or more other components of the UE 110 in the wireless communication network 100.

At block 705, the method 700 may receive control information indicating a report number of a plurality of interference reports associated with the interference measurement session. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive control information indicating a report number of a plurality of interference reports associated with the interference measurement session as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving control information indicating a report number of a plurality of interference reports associated with the interference measurement session.

At block 710, the method 700 may determine a plurality of times for measuring a plurality of reference signals associated with the interference measurement session. For example, the determination component 228, the processor 212, the memory 216, the modem 220, and/or the applications 275 of the UE 110 may determine a plurality of times for measuring a plurality of reference signals associated with the interference measurement session as described above.

In certain implementations, the determination component 228, the processor 212, the memory 216, the modem 220, and/or the applications 275 may be configured to and/or may define means for determining a plurality of times for measuring a plurality of reference signals associated with the interference measurement session.

At block 715, the method 700 may measure the plurality of reference signals at each of the plurality of determined times. For example, the measurement component 224, the processor 212, the memory 216, the modem 220, and/or the applications 275 of the UE 110 may measure the plurality of reference signals at each of the plurality of determined times.

In certain implementations, the measurement component 224, the processor 212, the memory 216, the modem 220, and/or the applications 275 may be configured to and/or may define means for measuring the plurality of reference signals at each of the plurality of determined times.

At block 720, the method 700 may generate the plurality of interference reports based on measuring the plurality of reference signals. For example, the report component 226, the processor 212, the memory 216, the modem 220, and/or the applications 275 of the UE 110 may generate the plurality of interference reports based on measuring the plurality of reference signals as described above.

In certain implementations, the report component 226, the processor 212, the memory 216, the modem 220, and/or the applications 275 may be configured to and/or may define means for generating the plurality of interference reports based on measuring the plurality of reference signals.

At block 725, the method 700 may transmit the plurality of interference reports to a base station (BS). For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the plurality of interference reports to a base station (BS) as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the plurality of interference reports to a base station (BS).

Alternatively or additionally, the method 700 may further include any of the methods above, wherein receiving the control information comprises receiving at least one of downlink control information (DCI), radio resource control (RRC) information, or a medium access control (MAC) control element (MAC-CE) comprising the control information.

Alternatively or additionally, the method 700 may further include any of the methods above, further comprising transmitting reporting times associated with generating the plurality of interference reports.

Alternatively or additionally, the method 700 may further include any of the methods above, further comprising transmitting an average time associated with generation times associated with generating the plurality of interference reports.

Alternatively or additionally, the method 700 may further include any of the methods above, wherein receiving the control information comprises receiving a repetition number indicating repetition of the interference measurement session.

Alternatively or additionally, the method 700 may further include any of the methods above, wherein receiving the control information further comprises receiving a gap duration between two adjacent interference measurement sessions.

Figure 8:
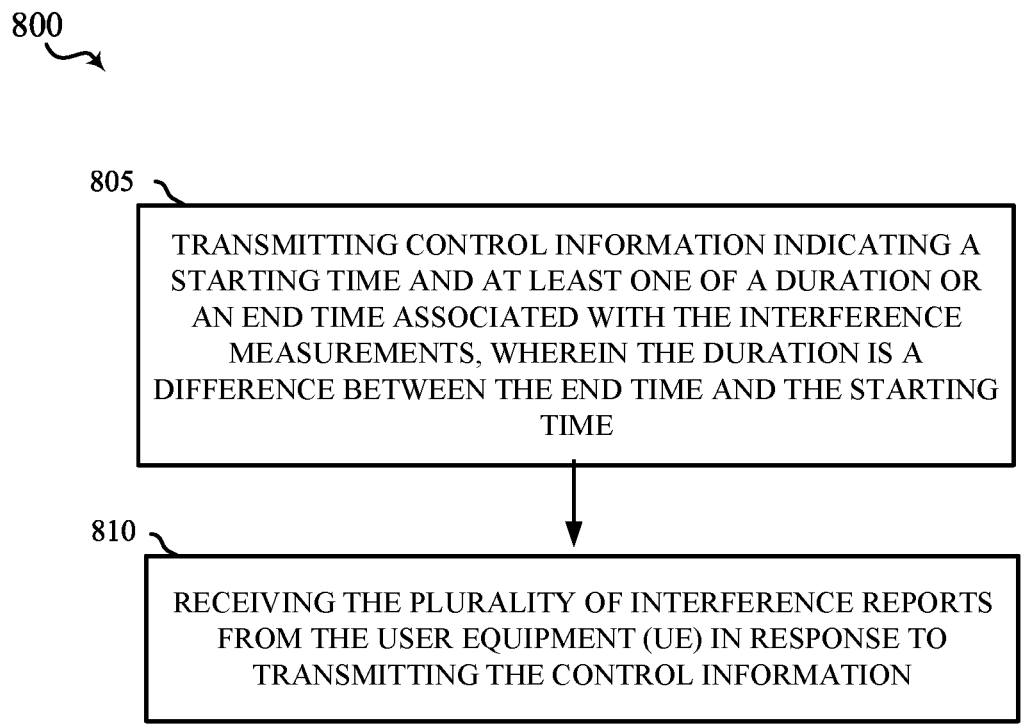
FIG. 8 is an example of a method for receiving measurement reports according to aspects of the present disclosure.

FIG. 8 is an example of a method for receiving measurement reports. For example, a method 800 may be performed by the one or more of the processor 312, the memory 316, the applications 375, the modem 320, the transceiver 302, the receiver 306, the transmitter 308, the RF front end 388, the communication component 322, and/or one or more other components of the BS 105 in the wireless communication network 100.

At block 805, the method 800 may transmit control information indicating a starting time and at least one of a duration or an end time associated with the interference measurements, wherein the duration is a difference between the end time and the starting time. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit control information indicating a starting time and at least one of a duration or an end time associated with the interference measurements, wherein the duration is a difference between the end time and the starting time as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting control information indicating a starting time and at least one of a duration or an end time associated with the interference measurements, wherein the duration is a difference between the end time and the starting time.

At block 810, the method 800 may receive the plurality of interference reports from the user equipment (UE) in response to transmitting the control information. For example, the communication component 322, the transceiver 302, the receiver 306, the transmitter 308, the RF front end 388, the subcomponents of the RF front end 388, the processor 312, the memory 316, the modem 320, and/or the applications 375 of the UE 110 may receive the plurality of interference reports from the user equipment (UE) in response to transmitting the control information as described above. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving the plurality of interference reports from the user equipment (UE) in response to transmitting the control information.

Figure 9:
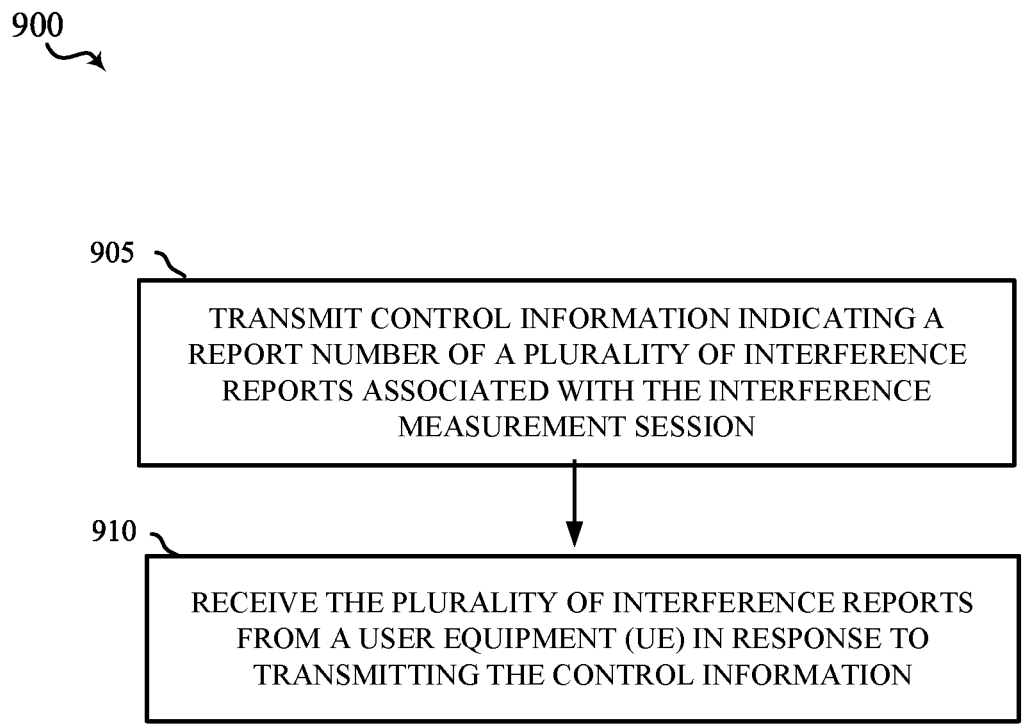
FIG. 9 is an example of a method for receiving measurement reports in multiple sessions according to aspects of the present disclosure.

FIG. 9 is an example of a method for receiving measurement reports in multiple sessions. For example, a method 900 may be performed by the one or more of the processor 312, the memory 316, the applications 375, the modem 320, the transceiver 302, the receiver 306, the transmitter 308, the RF front end 388, the communication component 322, and/or one or more other components of the UE 110 in the wireless communication network 100.

At block 905, the method 900 may transmit control information indicating a report number of a plurality of interference reports associated with the interference measurement session. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may transmit control information indicating a report number of a plurality of interference reports associated with the interference measurement session as described above. The communication component 322 may send the digital signals to the transceiver 302 or the transmitter 308. The transceiver 302 or the transmitter 308 may convert the digital signals to electrical signals and send to the RF front end 388. The RF front end 388 may filter and/or amplify the electrical signals. The RF front end 388 may send the electrical signals as electro-magnetic signals via the one or more antennas 365.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for transmitting control information indicating a report number of a plurality of interference reports associated with the interference measurement session.

At block 910, the method 900 may receive the plurality of interference reports from a user equipment (UE) in response to transmitting the control information. For example, the communication component 322, the transceiver 302, the receiver 306, the transmitter 308, the RF front end 388, the subcomponents of the RF front end 388, the processor 312, the memory 316, the modem 320, and/or the applications 375 of the BS 105 may receive the plurality of interference reports from a user equipment (UE) in response to transmitting the control information as described above. The RF front end 388 may receive the electrical signals converted from electro-magnetic signals. The RF front end 388 may filter and/or amplify the electrical signals. The transceiver 302 or the receiver 306 may convert the electrical signals to digital signals, and send the digital signals to the communication component 322.

In certain implementations, the communication component 322, the transceiver 302, the receiver 306, the transmitter 308, the RF front end 388, the subcomponents of the RF front end 388, the processor 312, the memory 316, the modem 320, and/or the applications 375 may be configured to and/or may define means for receiving the plurality of interference reports from a user equipment (UE) in response to transmitting the control information.

Figure 10:
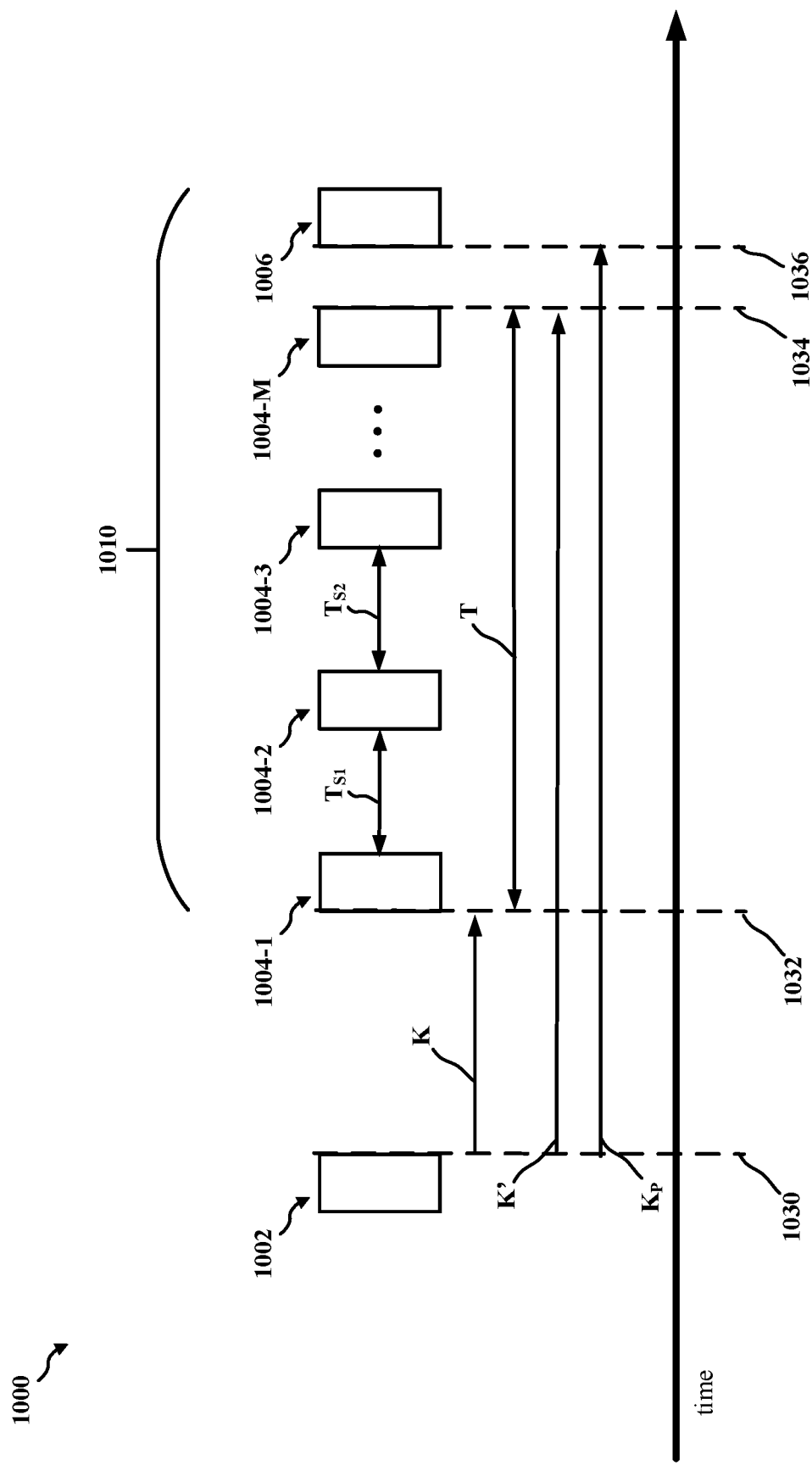
FIG. 10 is an example of a timing diagram for measuring interference reference signals with different periods between measurements.

FIG. 10 is an example of a timing diagram for measuring interference reference signals with different periods between the measurements. In an aspect, a timing diagram 1000 may illustrate timings for resources allocated for the measurement of interference reference signals and the reporting. The BS 105 may transmit at least one of a starting time, a duration, an end time, a frequency of measurement, a reporting time, or other parameters associated with the interference measurements. The BS 105 may transmit a report number (M) associated with the number of measurements and/or sub-reports and/or two or more periods ($T_{s1}$, $T_{s2}$ ... $T_{s(M-1)}$). Some or all of the periods may be different or the same. The periods may be individually signaled, or quantized values indicated in one or more tables. In response, the UE 110 may measure references signals and/or transmit report associated with the interference measurements based on the parameters indicated by the BS 105. In some implementations, the BS 105 may transmit control information 1002 to the UE 110. The UE 110 may receive the control information 1002. The UE 110 may identify a trigger time 1030 based on an indication in the control information 1002, or reception of the control information 1002. The trigger time 1030 may be the basis that the UE 110 relies on to determine timing of measuring interference on the reference signals to generate interference measurements.

In an aspect of the present disclosure, the UE 110 may receive the control information 1002, which includes information associated with an interference measurement session 1010. For example, the control information 1002 may include a K value to indicate a starting time 1032 of the interference measurement session 1010. Specifically, K may be the time (e.g., slots, orthogonal frequency division multiplexing (OFDM) symbols, or seconds) measured from the trigger time 1030. The starting time 1032 may indicate a first measurement 1004-1 of the measurements 1004-1, 1004-2 ... 1004-M, where M is the report number.

In one implementation, the UE 110 may receive the report number (M) associated with the number of measurements and/or sub-reports.

In some aspects of the present disclosure, the control information 1002 may include the $T_{s1}$, $T_{s2}$ ... $T_{s(M-1)}$ values to indicate the periods between the measurements 1004-1, 1004-2 ... 1004-M. Some or all of the values of the periods may be the same or different. The values of the periods may be indicated in the DCI, the RRC, and/or the MAC CE.

In one aspect, the control information 1002 may include a $K_P$ value to indicate a reporting time 1036 to transmit interference reports 1006 based on the results of the measurement 1004-1, 1004-2 ... 1004-n.

In certain aspects, the UE 110 may perform the measurements 1004-1, 1004-2 ... 1004-M based on the control information 1002 transmitted by the BS 105. The UE 110 may generate the interference reports 1006 based on the measurements 1004-1, 1004-2 ... 1004-M. The interference reports 1006 may include M sub-reports each associated with one of the measurements 1004-1, 1004-2 ... 1004-M. The UE 110 may transmit the interference reports 1006 to the BS 105 indicating the results of the measurements 1004-1, 1004-2 ... 1004-M. The interference reports 1006 may include one or more of interference average power, interference covariance matrix rank, ratio between minimum and maximum eigenvalues, maximum eigenvalue, or interference covariance matrix eigenvalues. The UE 110 may transmit the interference reports 1006 using resources allocated by the BS 105. In some aspects, the UE 110 may transmit the interference reports 1006 via a physical uplink control channel (PUCCH) or physical uplink shared channel (PUSCH).

In certain aspects, the resources allocated by the BS 105 for the interference reports 1006 may be indicated in the control information 1002.

In some aspects, the UE 110 may receive interference information for configuring at least one of quantization levels of interference power or the interference covariance matrix eigenvalues in response to transmitting the interference reports 1006.

Figure 11:
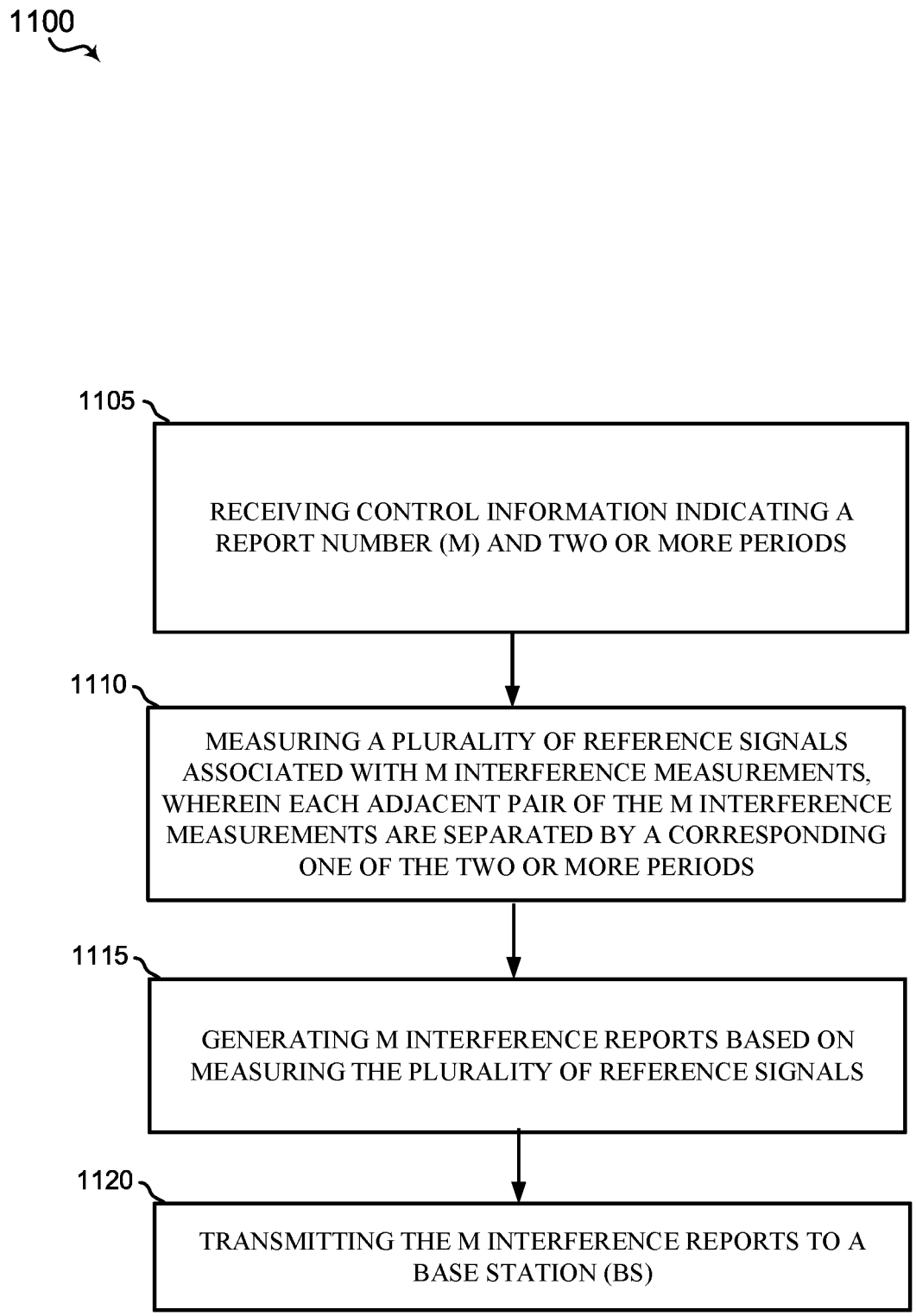
FIG. 11 is an example of a method for transmitting measurement reports based on interference measurements separated by different periods according to aspects of the present disclosure.

FIG. 11 is an example of a method for transmitting measurement reports based on interference measurements separated by different periods. For example, a method 1100 may be performed by the one or more of the processor 212, the memory 216, the applications 275, the modem 220, the transceiver 202, the receiver 206, the transmitter 208, the RF front end 288, the communication component 222, the measurement component 224, the report component 226, and/or the determination component 228, and/or one or more other components of the UE 110 in the wireless communication network 100.

At block 1105, the method 1100 may receive control information indicating a report number (M) and two or more periods. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive control information indicating a report number (M) and two or more periods as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving control information indicating a report number (M) and two or more periods.

At block 1110, the method 1100 may measure a plurality of reference signals associated with M interference measurements, wherein each adjacent pair of the M interference measurements are separated by a corresponding one of the two or more periods. For example, the measurement component 224, the processor 212, the memory 216, the modem 220, and/or the applications 275 of the UE 110 may measure a plurality of reference signals associated with M interference measurements, wherein each adjacent pair of the M interference measurements are separated by a corresponding one of the two or more periods as described above.

In certain implementations, the measurement component 224, the processor 212, the memory 216, the modem 220, and/or the applications 275 may be configured to and/or may define means for measuring a plurality of reference signals associated with M interference measurements, wherein each adjacent pair of the M interference measurements are separated by a corresponding one of the two or more periods.

At block 1115, the method 1100 may generate M interference reports based on measuring the plurality of reference signals. For example, the report component 226, the processor 212, the memory 216, the modem 220, and/or the applications 275 of the UE 110 may generate M interference reports based on measuring the plurality of reference signals as described above. In some instances, the plurality of interference reports may include interference measurements.

In certain implementations, the report component 226, the processor 212, the memory 216, the modem 220, and/or the applications 275 may be configured to and/or may define means for generating M interference reports based on measuring the plurality of reference signals.

At block 1120, the method 1100 may transmit the M interference reports to a base station (BS). For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the M interference reports to a base station (BS) as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the M interference reports to a base station (BS).

Figure 12:
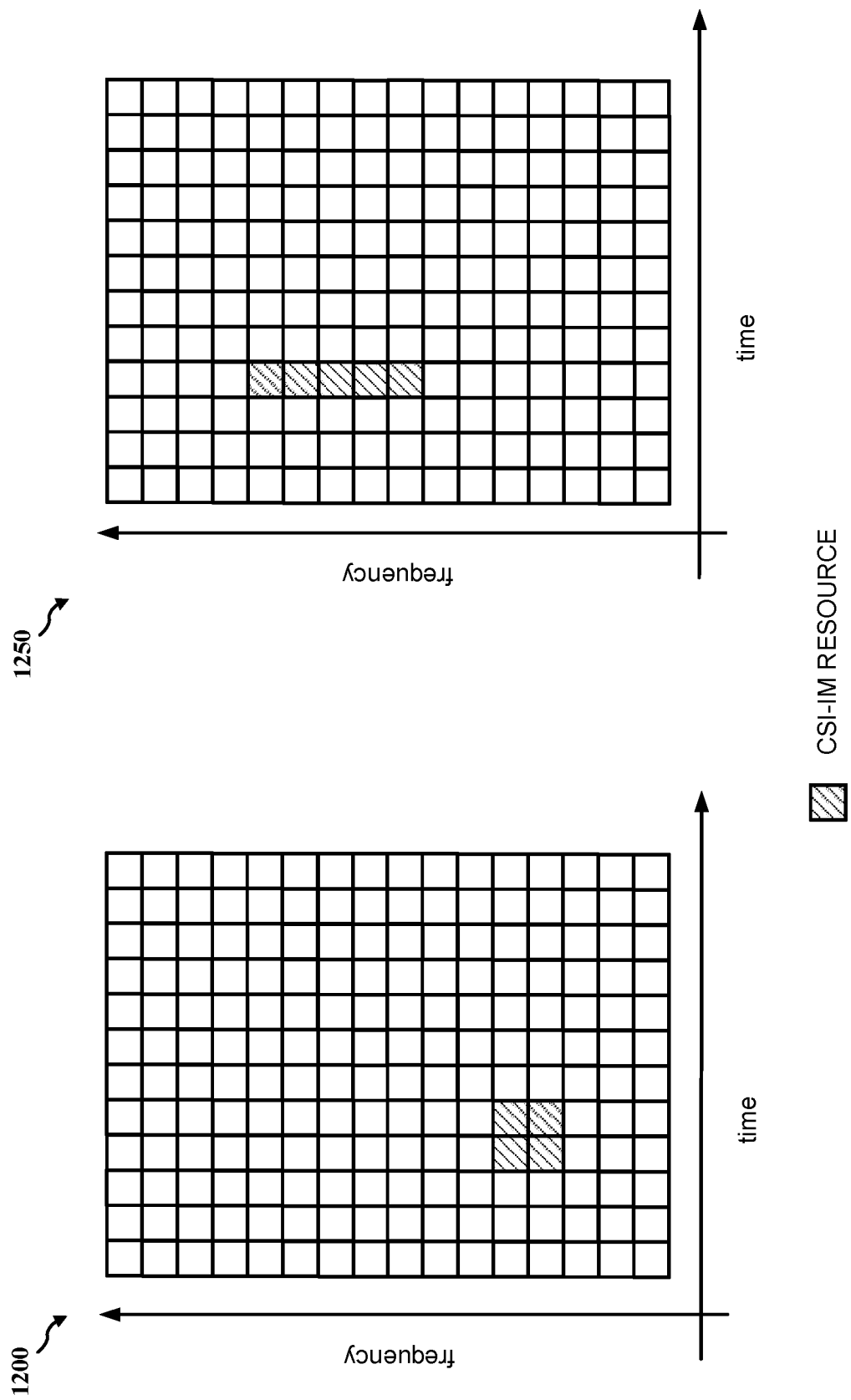
FIG. 12 illustrates examples of CSI-IM resource patterns according to aspects of the present disclosure.

FIG. 12 illustrates examples of CSI-IM resource patterns. In one implementation, the BS 105 may allocate resources shown in a first CSI-IM resource pattern 1200 for interference measurements. In another implementation, the BS 105 may allocate resources shown in a second CSI-IM resource pattern 1250 for interference measurements. The BS 105 may allocate CSI-IM resource patterns different than the CSI-IM resource patterns 1200, 1250 shown above.

Additional Implementations

Aspects of the present disclosure include methods by a user equipment (UE) for receiving control information indicating a starting time and at least one of a duration or an end time associated with the interference measurements, wherein the duration is a difference between the end time and the starting time, measuring a plurality of reference signals associated with the interference measurements between the starting time and the end time at a period, generating a plurality of interference reports based on measuring the plurality of reference signals, and transmitting the plurality of interference reports to a base station (BS).

Any of the methods above, wherein the plurality of reference signals are a plurality of channel state information interference measurement reference signals or zero-power channel state information reference signals resource.

Any of the methods above, wherein receiving the control information comprises receiving at least one of downlink control information (DCI), radio resource control (RRC) information, or a medium access control (MAC) control element (MAC-CE) comprising the control information.

Any of the methods above, wherein receiving the control information comprises receiving at least one of the period, a number of the plurality of interference reports, or a frequency location of resources allocated for transmitting the plurality of interference reports.

Any of the methods above, wherein at least one of the plurality of interference reports comprises one or more of interference average power, interference covariance matrix rank, ratio between minimum and maximum eigenvalues, maximum eigenvalue, or interference covariance matrix eigenvalues.

Any of the methods above, further comprising receiving, in response to transmitting the plurality of interference reports, interference information for configuring at least one of quantization levels of interference power or the interference covariance matrix eigenvalues.

Any of the methods above, wherein receiving the control information comprises receiving a configuration indicator of a plurality of configuration indicators, wherein the configuration indicator is associated with the starting time and at least one of the duration or the end time.

Any of the methods above, wherein receiving the control information comprises receiving at least one of downlink control information (DCI) or a medium access control (MAC) control element (MAC-CE) comprising the control information and wherein measuring the plurality of reference signals is triggered by the reception of the DCI or the MAC-CE.

Other aspects of the present disclosure include a user equipment (UE) having a memory comprising instructions, a transceiver, and one or more processors operatively coupled with the memory and the transceiver, the one or more processors configured to execute instructions in the memory to receive control information indicating a starting time and at least one of a duration or an end time associated with the interference measurements, wherein the duration is a difference between the end time and the starting time, measure a plurality of reference signals associated with the interference measurements between the starting time and the end time at a period, generate a plurality of interference reports based on measuring the plurality of reference signals, and transmit the plurality of interference reports to a base station (BS).

Any of the UEs above, wherein the plurality of reference signals are a plurality of channel state information interference measurement reference signals or zero-power channel state information reference signals resource.

Any of the UEs above, wherein receiving the control information comprises receiving at least one of downlink control information (DCI), radio resource control (RRC) information, or a medium access control (MAC) control element (MAC-CE) comprising the control information.

Any of the UEs above, wherein receiving the control information comprises receiving at least one of the period, a number of the plurality of interference reports, or a frequency location of resources allocated for transmitting the plurality of interference reports.

Any of the UEs above, wherein at least one of the plurality of interference reports comprises one or more of interference average power, interference covariance matrix rank, ratio between minimum and maximum eigenvalues, maximum eigenvalue, or interference covariance matrix eigenvalues.

Any of the UEs above, wherein the one or more processors are further configured to receive, in response to transmitting the plurality of interference reports, interference information for configuring at least one of quantization levels of interference power or the interference covariance matrix eigenvalues.

Any of the UEs above, wherein receiving the control information comprises receiving a configuration indicator of a plurality of configuration indicators, wherein the configuration indicator is associated with the starting time and at least one of the duration or the end time.

Any of the UEs above, wherein receiving the control information comprises receiving at least one of downlink control information (DCI) or a medium access control (MAC) control element (MAC-CE) comprising the control information and wherein measuring the plurality of reference signals is triggered by the reception of the DCI or the MAC-CE.

An aspect of the present disclosure includes a user equipment (UE) including means for receiving control information indicating a starting time and at least one of a duration or an end time associated with the interference measurements, wherein the duration is a difference between the end time and the starting time, means for measuring a plurality of reference signals associated with the interference measurements between the starting time and the end time at a period, means for generating a plurality of interference reports based on measuring the plurality of reference signals, and means for transmitting the plurality of interference reports to a base station (BS).

Any of the UEs above, wherein the plurality of reference signals are a plurality of channel state information interference measurement reference signals or zero-power channel state information reference signals resource.

Any of the UEs above, wherein means for receiving the control information comprises means for receiving at least one of downlink control information (DCI), radio resource control (RRC) information, or a medium access control (MAC) control element (MAC-CE) comprising the control information.

Any of the UEs above, wherein means for receiving the control information comprises means for receiving at least one of the period, a number of the plurality of interference reports, or a frequency location of resources allocated for transmitting the plurality of interference reports.

Any of the UEs above, wherein at least one of the plurality of interference reports comprises one or more of interference average power, interference covariance matrix rank, ratio between minimum and maximum eigenvalues, maximum eigenvalue, or interference covariance matrix eigenvalues.

Any of the UEs above, further comprising means for receiving, in response to transmitting the plurality of interference reports, interference information for configuring at least one of quantization levels of interference power or the interference covariance matrix eigenvalues.

Any of the UEs above, wherein means for receiving the control information comprises means for receiving a configuration indicator of a plurality of configuration indicators, wherein the configuration indicator is associated with the starting time and at least one of the duration or the end time.

Any of the UEs above, wherein means for receiving the control information comprises means for receiving at least one of downlink control information (DCI) or a medium access control (MAC) control element (MAC-CE) comprising the control information and wherein measuring the plurality of reference signals is triggered by the reception of the DCI or the MAC-CE.

Some aspects of the present disclosure include non-transitory computer readable media having instructions stored therein that, when executed by one or more processors of a user equipment (UE), cause the one or more processors to receive control information indicating a starting time and at least one of a duration or an end time associated with the interference measurements, wherein the duration is a difference between the end time and the starting time, measure a plurality of reference signals associated with the interference measurements between the starting time and the end time at a period, generate a plurality of interference reports based on measuring the plurality of reference signals, and transmit the plurality of interference reports to a base station (BS).

Any of the non-transitory computer readable media above, wherein the plurality of reference signals are a plurality of channel state information interference measurement reference signals or zero-power channel state information reference signals resource.

Any of the non-transitory computer readable media above, wherein the instructions for receiving the control information comprises instructions for receiving at least one of downlink control information (DCI), radio resource control (RRC) information, or a medium access control (MAC) control element (MAC-CE) comprising the control information.

Any of the non-transitory computer readable media above, wherein the instructions for receiving the control information comprises instructions for receiving at least one of the period, a number of the plurality of interference reports, or a frequency location of resources allocated for transmitting the plurality of interference reports.

Any of the non-transitory computer readable media above, wherein at least one of the plurality of interference reports comprises one or more of interference average power, interference covariance matrix rank, ratio between minimum and maximum eigenvalues, maximum eigenvalue, or interference covariance matrix eigenvalues.

Any of the non-transitory computer readable media above, further comprising instructions, when executed by the one or more processors, cause the one or more processors to receive, in response to transmitting the plurality of interference reports, interference information for configuring at least one of quantization levels of interference power or the interference covariance matrix eigenvalues.

Any of the non-transitory computer readable media above, wherein the instructions for receiving the control information comprises further comprising instructions for receiving a configuration indicator of a plurality of configuration indicators, wherein the configuration indicator is associated with the starting time and at least one of the duration or the end time.

Any of the non-transitory computer readable media above, wherein the instructions for receiving the control information comprises instructions for receiving at least one of downlink control information (DCI) or a medium access control (MAC) control element (MAC-CE) comprising the control information and wherein measuring the plurality of reference signals is triggered by the reception of the DCI or the MAC-CE Aspects of the present disclosure include methods by a user equipment (UE) for receiving control information indicating a report number of a plurality of interference reports associated with the interference measurement session, determining a plurality of times for measuring a plurality of reference signals associated with the interference measurement session, measuring the plurality of reference signals at each of the plurality of determined times, generating the plurality of interference reports based on measuring the plurality of reference signals, and transmitting the plurality of interference reports to a base station (BS).

Any of the methods above, wherein receiving the control information comprises receiving at least one of downlink control information (DCI), radio resource control (RRC) information, or a medium access control (MAC) control element (MAC-CE) comprising the control information.

Any of the methods above, further comprising transmitting reporting times associated with generating the plurality of interference reports.

Any of the methods above, further comprising transmitting an average time associated with generation times associated with generating the plurality of interference reports.

Any of the methods above, wherein receiving the control information comprises receiving a repetition number indicating repetition of the interference measurement session.

Any of the methods above, wherein receiving the control information further comprises receiving a gap duration between two adjacent interference measurement sessions.

Other aspects of the present disclosure include a user equipment (UE) having a memory comprising instructions, a transceiver, and one or more processors operatively coupled with the memory and the transceiver, the one or more processors configured to execute instructions in the memory to receive control information indicating a report number of a plurality of interference reports associated with the interference measurement session, determine a plurality of times for measuring a plurality of reference signals associated with the interference measurement session, measure the plurality of reference signals at each of the plurality of determined times, generate the plurality of interference reports based on measuring the plurality of reference signals, and transmit the plurality of interference reports to a base station (BS).

Any of the UEs above, wherein receiving the control information comprises receiving at least one of downlink control information (DCI), radio resource control (RRC) information, or a medium access control (MAC) control element (MAC-CE) comprising the control information.

Any of the UEs above, wherein the one or more processors are further configured to transmit reporting times associated with generating the plurality of interference reports.

Any of the UEs above, wherein the one or more processors are further configured to transmit an average time associated with generation times associated with generating the plurality of interference reports.

Any of the UEs above, wherein receiving the control information comprises receiving a repetition number indicating repetition of the interference measurement session.

Any of the UEs above, wherein receiving the control information further comprises receiving a gap duration between two adjacent interference measurement sessions.

An aspect of the present disclosure includes a user equipment (UE) including means for receiving control information indicating a report number of a plurality of interference reports associated with the interference measurement session, means for determining a plurality of times for measuring a plurality of reference signals associated with the interference measurement session, means for measuring the plurality of reference signals at each of the plurality of determined times, means for generating the plurality of interference reports based on measuring the plurality of reference signals, and means for transmitting the plurality of interference reports to a base station (BS).

Any of the UEs above, wherein means for receiving the control information comprises means for receiving at least one of downlink control information (DCI), radio resource control (RRC) information, or a medium access control (MAC) control element (MAC-CE) comprising the control information.

Any of the UEs above, further comprising means for transmitting reporting times associated with generating the plurality of interference reports.

Any of the UEs above, further comprising means for transmitting an average time associated with generation times associated with generating the plurality of interference reports.

Any of the UEs above, wherein means for receiving the control information comprises means for receiving a repetition number indicating repetition of the interference measurement session.

Any of the UEs above, wherein means for receiving the control information further comprises means for receiving a gap duration between two adjacent interference measurement sessions.

Some aspects of the present disclosure include non-transitory computer readable media having instructions stored therein that, when executed by one or more processors of a user equipment (UE), cause the one or more processors to receive control information indicating a report number of a plurality of interference reports associated with the interference measurement session, determine a plurality of times for measuring a plurality of reference signals associated with the interference measurement session, measure the plurality of reference signals at each of the plurality of determined times, generate the plurality of interference reports based on measuring the plurality of reference signals, and transmit the plurality of interference reports to a base station (BS).

Any of the non-transitory computer readable media above, wherein the instructions for receiving the control information comprises comprising instructions for receiving at least one of downlink control information (DCI), radio resource control (RRC) information, or a medium access control (MAC) control element (MAC-CE) comprising the control information.

Any of the non-transitory computer readable media above, further comprising instructions, when executed by the one or more processors, cause the one or more processors to transmit reporting times associated with generating the plurality of interference reports.

Any of the non-transitory computer readable media above, further comprising instructions, when executed by the one or more processors, cause the one or more processors to transmit an average time associated with generation times associated with generating the plurality of interference reports.

Any of the non-transitory computer readable media above, wherein the instructions for receiving the control information comprises instructions for receiving a repetition number indicating repetition of the interference measurement session.

Any of the non-transitory computer readable media above, wherein the instructions for receiving the control information further comprises instructions for receiving a gap duration between two adjacent interference measurement sessions.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of interference measurements by a user equipment (UE) in a network, comprising:
    receiving control information indicating a starting time and at least one of a duration or an end time associated with the interference measurements, wherein the duration is a difference between the end time and the starting time;
    measuring a plurality of reference signals associated with the interference measurements between the starting time and the end time at a period;
    generating a plurality of interference reports, comprising one or more of interference average power, interference covariance matrix ratio between minimum and maximum eigenvalues, maximum eigenvalue, or interference covariance matrix eigenvalues, based on measuring the plurality of reference signals;
    transmitting the plurality of interference reports to a base station (BS); and
    receiving, in response to transmitting the plurality of interference reports, interference information for configuring at least one of quantization levels of interference power or the interference covariance matrix eigenvalues.

2. The method of claim 1, wherein:
    the plurality of reference signals are a plurality of channel state information interference measurement reference signals or zero-power channel state information reference signals resource.

3. The method of claim 1, wherein receiving the control information comprises:
    receiving at least one of downlink control information (DCI), radio resource control (RRC) information, or a medium access control (MAC) control element (MAC-CE) comprising the control information.

4. The method of claim 1, wherein receiving the control information comprises:
    receiving at least one of the period, a number of the plurality of interference reports, or a frequency location of resources allocated for transmitting the plurality of interference reports.

5. The method of claim 1, wherein receiving the control information comprises:
    receiving a configuration indicator of a plurality of configuration indicators, wherein the configuration indicator is associated with the starting time and at least one of the duration or the end time.

6. The method of claim 1, wherein receiving the control information comprises receiving at least one of downlink control information (DCI) or a medium access control (MAC) control element (MAC-CE) comprising the control information; and
    wherein measuring the plurality of reference signals is triggered by the reception of the DCI or the MAC-CE.

7. A user equipment (UE), comprising:
    a memory comprising instructions;
    a transceiver; and
    one or more processors operatively coupled with the memory and the transceiver, the one or more processors configured to execute instructions in the memory to:
        receive control information indicating a starting time and at least one of a duration or an end time associated with interference measurements, wherein the duration is a difference between the end time and the starting time;
        measure a plurality of reference signals associated with the interference measurements between the starting time and the end time at a period;
        generate a plurality of interference reports, comprising one or more of interference average power, interference covariance matrix ratio between minimum and maximum eigenvalues, maximum eigenvalue, or interference covariance matrix eigenvalues, based on measuring the plurality of reference signals;

transmit the plurality of interference reports to a base station (BS); and receive, in response to transmitting the plurality of interference reports, interference information for configuring at least one of quantization levels of interference power or the interference covariance matrix eigenvalues.

8. The UE of claim 7, wherein:
the plurality of reference signals are a plurality of channel state information interference measurement reference signals or zero-power channel state information reference signals resource.

9. The UE of claim 7, wherein receiving the control information comprises:
receiving at least one of downlink control information (DCI), radio resource control (RRC) information, or a medium access control (MAC) control element (MAC-CE) comprising the control information.

10. The UE of claim 7, wherein receiving the control information comprises:
receiving at least one of the period, a number of the plurality of interference reports, or a frequency location of resources allocated for transmitting the plurality of interference reports.

11. The UE of claim 7, wherein receiving the control information comprises:
receiving a configuration indicator of a plurality of configuration indicators, wherein the configuration indicator is associated with the starting time and at least one of the duration or the end time.

12. The UE of claim 7, wherein receiving the control information comprises receiving at least one of downlink control information (DCI) or a medium access control (MAC) control element (MAC-CE) comprising the control information;
wherein measuring the plurality of reference signals is triggered by the reception of the DCI or the MAC-CE.

13. A non-transitory computer readable medium having instructions stored therein that, when executed by one or more processors of a user equipment (UE), cause the one or more processors to:
receive control information indicating a starting time and at least one of a duration or an end time associated with interference measurements, wherein the duration is a difference between the end time and the starting time;
measure a plurality of reference signals associated with the interference measurements between the starting time and the end time at a period;
generate a plurality of interference reports, comprising one or more of interference average power, interference covariance matrix ratio between minimum and maximum eigenvalues, maximum eigenvalue, or interference covariance matrix eigenvalues, based on measuring the plurality of reference signals;
transmit the plurality of interference reports to a base station (BS); and
receive, in response to transmitting the plurality of interference reports, interference information for configuring at least one of quantization levels of interference power or the interference covariance matrix eigenvalues.

14. The non-transitory computer readable medium of claim 13, wherein:
the plurality of reference signals are a plurality of channel state information interference measurement reference signals or zero-power channel state information reference signals resource.

15. The non-transitory computer readable medium of claim 13, wherein the instructions for receiving the control information comprises instructions for:
receiving at least one of downlink control information (DCI), radio resource control (RRC) information, or a medium access control (MAC) control element (MAC-CE) comprising the control information.

16. The non-transitory computer readable medium of claim 13, wherein the instructions for receiving the control information comprises instructions for:
receiving at least one of the period, a number of the plurality of interference reports, or a frequency location of resources allocated for transmitting the plurality of interference reports.

17. The non-transitory computer readable medium of claim 13, wherein the instructions for receiving the control information comprises further comprising instructions for:
receiving a configuration indicator of a plurality of configuration indicators, wherein the configuration indicator is associated with the starting time and at least one of the duration or the end time.

18. A user equipment (UE), comprising:
means for receiving control information indicating a starting time and at least one of a duration or an end time associated with interference measurements, wherein the duration is a difference between the end time and the starting time;
means for measuring a plurality of reference signals associated with the interference measurements between the starting time and the end time at a period;
means for generating a plurality of interference reports, comprising one or more of interference average power, interference covariance matrix ratio between minimum and maximum eigenvalues, maximum eigenvalue, or interference covariance matrix eigenvalues, based on measuring the plurality of reference signals;
means for transmitting the plurality of interference reports to a base station (BS); and
means for receiving, in response to transmitting the plurality of interference reports, interference information for configuring at least one of quantization levels of interference power or the interference covariance matrix eigenvalues.

19. The UE of claim 18, wherein:
the plurality of reference signals are a plurality of channel state information interference measurement reference signals or zero-power channel state information reference signals resource.

20. The UE of claim 18, wherein means for receiving the control information comprises:
means for receiving at least one of downlink control information (DCI), radio resource control (RRC) information, or a medium access control (MAC) control element (MAC-CE) comprising the control information.

21. The UE of claim 18, wherein means for receiving the control information comprises:
means for receiving at least one of the period, a number of the plurality of interference reports, or a frequency location of resources allocated for transmitting the plurality of interference reports.

22. The UE of claim 18, wherein means for receiving the control information comprises:
means for receiving a configuration indicator of a plurality of configuration indicators, wherein the configuration indicator is associated with the starting time and at least one of the duration or the end time.

* * * * *